J. C. W. GRETH.
WATER PURIFYING APPARATUS.
APPLICATION FILED MAY 26, 1908.
973,424.
Patented Oct. 18, 1910.
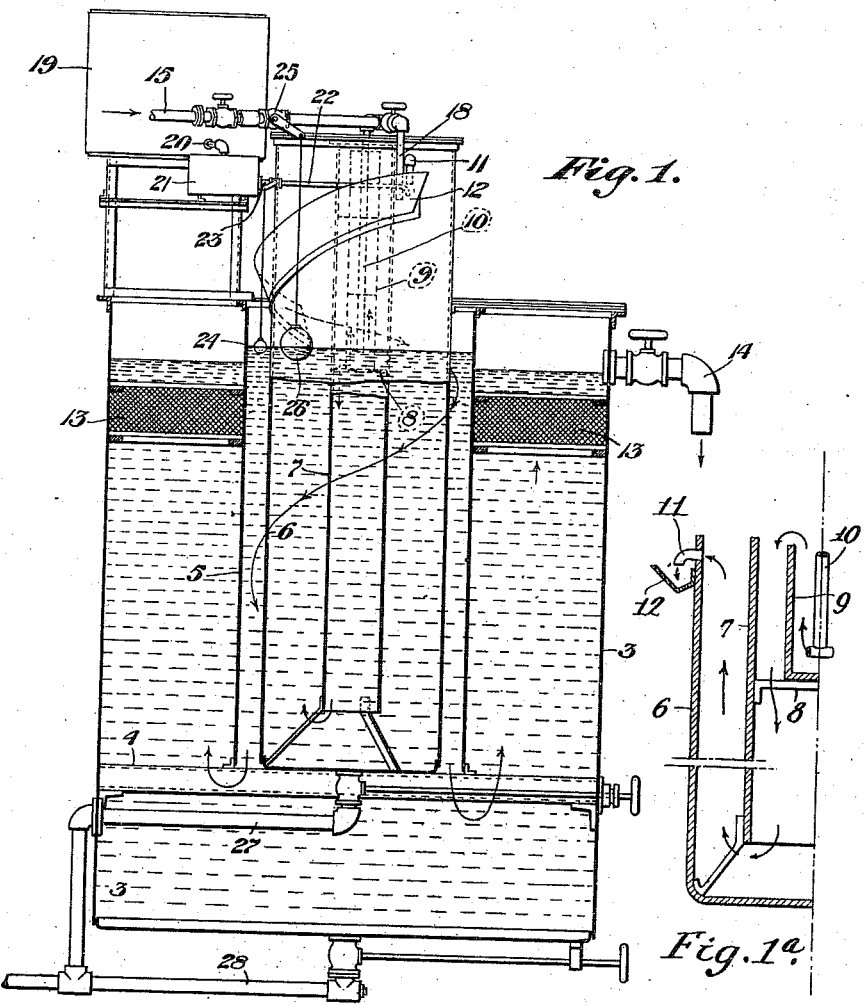
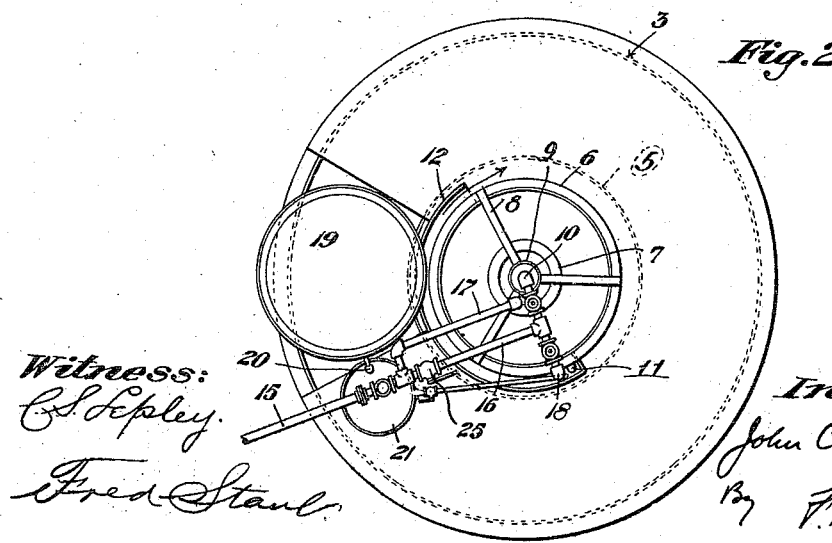

UNITED STATES PATENT OFFICE.

JOHN C. W. GRETH, OF PITTSBURG, PENNSYLVANIA, ASSIGNOR TO WM. B. SCAIFE & SONS COMPANY, OF PITTSBURG, PENNSYLVANIA, A CORPORATION OF PENNSYLVANIA.

WATER-PURIFYING APPARATUS.

973,424.  Specification of Letters Patent.  Patented Oct. 18, 1910.

Application filed May 26, 1908. Serial No. 435,059.

*To all whom it may concern:*

Be it known that I, JOHN C. W. GRETH, a citizen of the United States, residing at Pittsburg, in the State of Pennsylvania, have invented certain new and useful Improvements in Water-Purifying Apparatus, of which the following is a specification.

My invention relates especially to water purifying plants of the continuous type, and its primary objects are to improve the mixing of chemicals in the treating compartment, to assemble the apparatus so as to use gravity feed and make it more compact and efficient in operation, and to generally improve such apparatus, as will hereinafter appear. These and other advantages are obtained by the constructions illustrated in one form in the accompanying drawing, wherein—

Figure 1 is a partial vertical section of a water purifying plant embodying my invention, Fig. 1$^a$ is a partial vertical section of the inner parts and Fig. 2 is a plan view of the same.

The proper proportioning of the raw water to the amount of chemical used for reaction, under the varying conditions of flow and pressure, is very necessary, and owing to the necessity of good mixing is a very difficult problem to solve. It is highly essential also to be able to control currents flowing through the apparatus and the pressures at various points in order to efficiently mix the chemicals for reaction. In the present devices I have combined some features previously patented to me with a novel arrangement of saturating tank and feed tanks and a novel feed for the chemical, etc. Thus, as designed in the drawing, I provide the tank 3 which is used for reaction and settling, and place within it or on it all the rest of the apparatus. Inside the tank 3, on a support 4, I provide an open shell 5 within which is a saturating compartment 6, closed at the bottom. The space between the tank 6 and the open shell 5, communicates directly with the lower part of the large tank 3 and is also open at the top. Within the tank 6 I support a smaller cylinder 7 which constitutes part of the saturating compartment, and on a support 8 therein there is provided a closed bottomed vessel 9 for containing the chemical. Within this again is a downwardly opening pipe 10 through which water enters and passes upward carrying the chemical over the top of vessel 9 and down through the cylinder 7, thence upward to the top of tank 6, and then through an outlet pipe 11, from whence the water flows into a helical trough 12, and by this means is emptied into the space between the tank 6 and the shell 5. This latter forms part of the reaction and settling tank, and the water flows downward through this space and upward through the outside space in tank 3 and through the filters 13, whence it is carried off by overflow through pipe 14 for use. The main supply pipe 15 for raw water has one branch connecting with pipe 10 and another branch with a downward spout at 18 emptying into the trough 12. Another branch 17 of the main supply pipe 15 is used to introduce water into the compartment 7, as when used to slake lime, etc.

Where a second chemical solution is to be used, I may place the solution tank 19 on top of the tank 3 and from it a pipe 20 leads into a solution regulator 21 which has a pipe 22 also emptying into trough 12 and automatically controlled in amount of feed by valve 23 and float 24. The main supply of water is also automatically regulated by valve 25 operated by float 26 in the saturating compartment 6. For cleaning I provide a sewer outlet 27 from compartment 6 and outlet 28 from tank 3. It will be noted by this arrangement I secure a gravity flow of the reagents through the reaction compartment and all feeds are by gravity. The trough 12 is especially valuable as it introduces the saturated chemical solutions into the reaction compartment in a controllable current, and forcibly and yet without violent agitation or mixing with air, and gives the water a circular motion in the top of space between 5 and 6, whence it flows downward, but not to the bottom, and thence upward again, in order to allow for easy precipitation of the impurities. The feed, it will be observed, is a displacement feed and the proportion of the chemical carried out from vessel 9 always accords exactly with the amount of raw water flowing into tank 3. By using gravity flow for feeding the chemical I avoid pumps or injectors and by means of the trough am enabled to control the currents in a downward helical path which has proven to give a very efficient action. By the arrangements described the lime vessel can be taken out for cleaning and removal of sediment, and the elevated trough feed enables the velocity of inflow to be regulated without changing the volume.

Other advantages of the device will readily occur to those familiar with the art.

Having thus described my invention and illustrated its use, what I claim as new and desire to secure by Letters Patent, is the following:

1. In water purifying apparatus, the combination of a settling tank, an open ended shell therein, a saturating vessel inside of said shell and forming between it and the shell a reaction chamber, re-agent feeding means in said vessel, means providing for a reverse vertical flow in the feeding means and also through the saturating vessel, an overflow outlet therefrom into the annular re-action chamber, and means for discharging said overflow into the re-action chamber and simultaneously mixing water therewith, substantially as described.

2. In water purifying apparatus, the combination of a saturating vessel, a shell surrounding the same and forming a reaction compartment and a single vessel inclosing the whole and forming a settling compartment, means to feed the re-action compartment with a re-agent and with water in definite quantities, and a helical trough to receive the same and introduce it after mixing into the re-action compartment.

3. In water purifying apparatus, the combination with a central saturating tank having an overflow, of a helical trough surrounding said tank to receive the overflow, means to supply definite proportions of raw water and re-agent in said trough, an annular vessel surrounding the saturating tank below said trough, the same having an open bottom, and a settling tank communicating therewith.

4. A water purifying device, comprising a settling tank of annular form, means forming an open bottom annular re-action chamber within the settling tank, a re-agent and water supply and a helical trough carrying the re-agent and water into said annular re-action chamber with a circular motion, substantially as described.

In testimony whereof I have hereunto signed my name in the presence of the two subscribed witnesses.

JOHN C. W. GRETH.

Witnesses:
F. W. H. CLAY,
CHAS. S. LEPLEY.